US008429728B2

(12) United States Patent
Feder et al.

(10) Patent No.: US 8,429,728 B2
(45) Date of Patent: Apr. 23, 2013

(54) PRE-REGISTRATION SECURITY SUPPORT IN MULTI-TECHNOLOGY INTERWORKING

(75) Inventors: Peretz Feder, Englewood, NJ (US); Semyon Mizikovsky, Morganville, NJ (US)

(73) Assignee: Alcatel Lucent, Paris (FR)

( * ) Notice: Subject to any disclaimer, the term of this patent is extended or adjusted under 35 U.S.C. 154(b) by 354 days.

(21) Appl. No.: 12/652,315

(22) Filed: Jan. 5, 2010

(65) Prior Publication Data
US 2011/0047592 A1 Feb. 24, 2011

Related U.S. Application Data (60) Provisional application No. 61/275,008, filed on Aug. 24, 2009.

(51) Int. Cl.
H04L 29/06 (2006.01)
(52) U.S. Cl.
USPC .............................................. 726/6; 380/272
(58) Field of Classification Search .................. 726/5–7; 380/247, 248, 270, 271, 272, 273
See application file for complete search history.

(56) References Cited

U.S. PATENT DOCUMENTS

| 2009/0133102 A1* | 5/2009 | Wen et al. .......................... 726/4 |
| 2010/0138661 A1* | 6/2010 | Tsai et al. ...................... 713/171 |
| 2010/0208690 A1* | 8/2010 | Guo et al. ...................... 370/331 |

FOREIGN PATENT DOCUMENTS

| WO | 2009/008627 A2 | 1/2009 |
| WO | 2009/051400 A2 | 4/2009 |
| WO | 2009/051405 A2 | 4/2009 |
| WO | PCT/US2010/046118 | 3/2011 |

OTHER PUBLICATIONS

3GPP2 (3rd Generation Partnership Project 2) 1xEV-DO Inter-Operability Specification (IOS) for CDMA 2000 Access Network Interfaces, Release 0, , Jun. 2001, 118 pages.
B. Aboba et al., "Extensible Authentication Protocol (EAP) Key Management Framework," Network Working Group, RFC 5247, Aug. 2008, pp. 1-80.
R. Droms, "Dynamic Host Configuration Protocol," Network Working Group, RFC 2131, Mar. 1997, pp. 1-45.
WiMAX Forum Network Architecture, "Detailed Protocols and Procedures Base Specification," WMF-T33-001-R015v01, Nov. 21, 2009, 1067 pages, (REF4a, REF4b, REF4c and REF4d).

(Continued)

Primary Examiner — Edward Zee
(74) Attorney, Agent, or Firm — Ryan, Mason & Lewis, LLP (57) ABSTRACT

Pre-registration security support in a multiple access technology environment is disclosed. For example, a method is disclosed for use in a computing device of a communication system. The communication system supports two or more access technologies for permitting a communication device to access the communication system, and at least part of a first security context is generated at the computing device for a given communication device permitting the given communication device to access the communication system via a first access technology. The method comprises generating at the computing device at least part of at least a second security context for the given communication device such that the given communication device is pre-registered to access the communication system via at least a second access technology while maintaining the first security context such that the given communication device continues to access the communication system via the first access technology and is pre-registered to subsequently access the communication system via the second access technology.

21 Claims, 8 Drawing Sheets

OTHER PUBLICATIONS

C. Perkins, "IP Mobility Support for IPv4," Network Working Group, RFC 3344, Aug. 2002, pp. 1-99.
D. Johnson et al., "Mobility Support in IPv6," Network Working Group, RFC 3775, Jun. 2004, pp. 1-165.
S. Gundavelli et al., "Proxy Mobile IPv6," Network Working Group, RFC 5213, Aug. 2008, pp. 1-93.
C. Rigney et al., "Remote Authentication Dial in User Service (RADIUS)," Network Working Group, RFC 2865, Jun. 2000, pp. 1-76.
P. Calhoun et al., "Diameter Network Access Server Application," Network Working Group, RFC 4005, Aug. 2005, pp. 1-85.

* cited by examiner

PRE-REGISTRATION SECURITY SUPPORT IN MULTI-TECHNOLOGY INTERWORKING

CROSS REFERENCE TO RELATED APPLICATION

The present application claims priority to the U.S. Provisional Patent Application identified as Ser. No. 61/275,008, filed on Aug. 24, 2009, and entitled "Method for Pre-Registration Security Support in Multi-Technology Interworking," the disclosure of which is incorporated by reference herein.

FIELD OF THE INVENTION

The present invention relates generally to security in communication systems and, more particularly, to pre-registration security support in a multiple access technology environment.

BACKGROUND OF THE INVENTION

In recent years, the number of offered communication system access technologies with comparable performance significantly increased, making it prudent to manufacture multi-mode wireless access terminals. That is, it is not unusual to come across the mobile terminal that is capable of operating on CDMA (Code Division Multiple Access) and 1xEV-DO (Evolution-Data Optimized) defined by 3GPP2—Third Generation Partnership Project 2; GSM (Global System for Mobile), UMTS (Universal Mobile Telecommunications System) also known as WCDMA, GPRS (General Packet Radio Service) for UMTS, EDGE (Enhanced Data rates for GSM Evolution) defined by the 3GPP—Third Generation Partnership Project; WiFi (Wireless Fidelity—class of wireless local area network (WLAN) devices based on the IEEE 802.11 standards), WiMAX (Worldwide Interoperability for Microwave) defined by the WiMAX Forum, etc. Interworking between two or more access technologies becomes crucial for wireless core network operators, as they can offer the common core network services to the users owning the multi-mode terminals.

As the wireless terminal accesses the network, it is authenticated for legitimacy. This authentication may be specific for a given access technology, but with proliferation of an Encapsulated Authentication Protocol (EAP), a common authentication framework transparent to the access technology became popular. EAP is disclosed in detail in IETF RFC 5247, Extensible Authentication Protocol (EAP) Key Management Framework, August 2008, the disclosure of which is incorporated by reference herein.

However, existing EAP authentication operations do not permit multiple security contexts to be effectively maintained with respect to a given communication device for multiple access technologies. Thus, a need exists for overcoming this and other limitations of existing authentication schemes.

SUMMARY OF THE INVENTION

Principles of the invention provide for pre-registration security support in a multiple access technology environment.

For example, in one aspect, a method is provided for use in a computing device of a communication system, wherein the communication system supports two or more access technologies for permitting a communication device to access the communication system, and at least part of a first security context is generated at the computing device for a given communication device permitting the given communication device to access the communication system via a first access technology. The method comprises generating at the computing device at least part of at least a second security context for the given communication device such that the given communication device is pre-registered to access the communication system via at least a second access technology while maintaining the first security context such that the given communication device is able to continue to access the communication system via the first access technology and is pre-registered to subsequently access the communication system via the second access technology. The computing device may comprise an authentication server managed by a network service provider in the communication system.

Further, in another aspect, a method is provided for use in a communication device of a communication system, wherein the communication system supports two or more access technologies for permitting the communication device to access the communication system, and wherein at least part of a first security context is generated at the communication device permitting the communication device to access the communication system via a first access technology. The method comprises generating at the communication device at least part of at least a second security context for the given communication device such that the given communication device is pre-registered to access the communication system via at least a second access technology while maintaining the first security context such that the given communication device is able to continue to access the communication system via the first access technology and is pre-registered to subsequently access the communication system via the second access technology.

Advantageously, illustrative principles of the invention provide techniques for preserving multiple active, clearly distinguishable, security associations to allow simultaneous mobile registrations on multiple access technologies.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be appreciated that the phrase "communication system" is generally defined to include one or more communication networks that permit communications devices and/or network nodes to communicate/interact with other communication devices and/or network nodes, and through which one or more types of media can be transported. Such one or more types of media (i.e., multimedia) may include, but are not limited to, text-based data, graphics-based data, voice-based data (more generally, audio-type data), and video-based data.

Furthermore, while illustrative embodiments of the invention for providing pre-registration support for multiple access technologies are described below in terms of WiMAX and WiFi being the two exemplary access technologies, it is to be understood that the invention is not limited to these two access technologies nor to use with only two access technologies. That is, principles of the invention may be applied to many and varied other access technologies such as, but not limited to, CDMA, GSM, UMTS, 1xEV-DO, GPRS, and EDGE. It is also to be appreciated that principles of the invention are not limited to use in an EAP framework.

Further, the phrases "security context" and "security association" are used interchangeably herein and are generally defined to refer to cryptographic or secure data (e.g., one or more keys) generated for the purposes of authenticating an entity to a communication system.

Also, as used herein, a "server" is generally defined as one or more computing devices. It is to be further understood that a "node" may refer to a dedicated computing device in the communication system or it may refer to a functional part of a computing device that performs one or more other functions.

In accordance with an illustrative embodiment, a communication device (e.g., mobile terminal) can use the EAP to authenticate to the network it currently accesses, and in anticipation of possible handoffs to another available and supported technologies, it can pre-register and pre-authenticate on that access technology in advance. That way, when a decision to handoff a communication session from one access technology to another access technology is made, the resources on the target technology are already authorized, and the latency of handoff process is drastically reduced.

We now describe an illustrative embodiment wherein the multiple access technologies at issue include WiFi and WiMAX. In accordance with said illustrative embodiment, it is possible to concurrently perform the same EAP authentication scheme on two disparate access networks (access technologies) for the same HoA (home address) session at an overlapping period. In order to maintain a seamless HO (handoff), the scheme involves three common entities for both networks; that is, MS (mobile station) and its supplicant, the AAA (Authentication, Authorization and Accounting) server and the HA (home agent) server.

It is understood that a "supplicant," as used herein, refers to the part of the MS (communication device) that performs the secure access support function, i.e., the functional entity in the MS that participates in the creation of security contexts for accessing the communication system. As will be illustrated below, a communication device, in accordance with principles of the invention, may instantiate more than one supplicant, whereby each supplicant creates and maintains a separate security context. For example, one supplicant may create a first security context associated with a first access technology and a second supplicant may create a second security context associated with a second access technology. The one or more supplicants may be implemented in the MS as executable instruction code, hardware, or combinations thereof.

Figure 1:
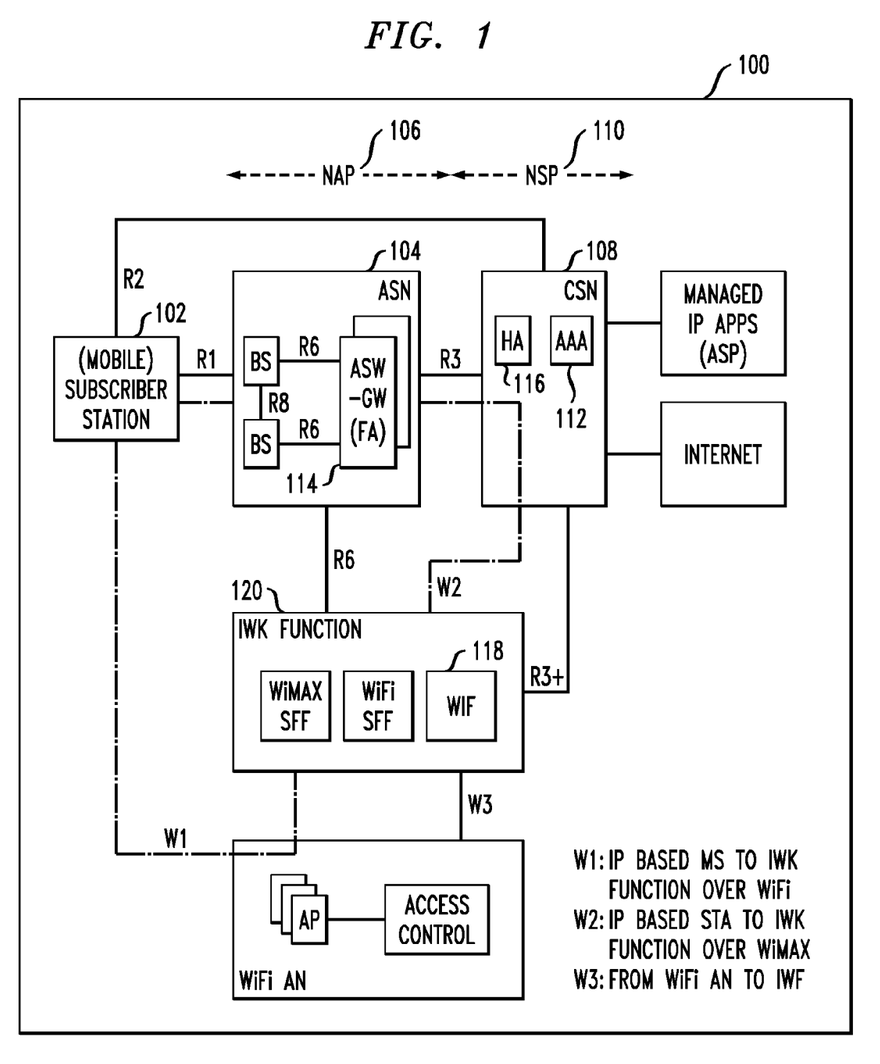
FIG. 1 illustrates a network reference model incorporating pre-registration security support in a multiple access technology environment according to one or more embodiments of the invention.

FIG. 1 shows an example of a network reference model (NRM) 100 for interworking between WiMAX and WiFi networks. It is to be understood that while the term "network" or "communication network" is used herein in terms of a particular access technology, the multiple access technologies are considered to be part of an overall "communication system."

In the NRM 100, it is assumed that the same multi-mode wireless terminal (communication device) MS 102 supports access to both WiMAX and WiFi technologies, and the accesses to the WiMAX network is through the R1 radio interface. The Access Serving Network (ASN) 104 that belongs to the Network Access Provider (NAP) 106 provides interconnectivity to the Core Serving Network (CSN) 108 that belongs to the Network Service Provider (NSP) 110 through a backhaul IP (Internet Protocol) based R3 interface.

The IP session is authorized through successful authentication between MS 102 and the home AAA server 112 in the CSN 108. As the result of this successful authentication, the AAA server 112 and MS 102 mutually generate a set of security associations (security context), i.e., secret keys, for access and mobility security. In one embodiment, such security associations are generated as defined in the WiMAX NWG Stage 3 Specifications WMF-T33-001-R015v01_Network-Stage3-Base, the disclosure of which is incorporated by reference herein. However, the present invention is not limited to use with these specific security associations or contexts.

The access security association is based on a Master Session Key (MSK) which is delivered by the AAA server 112 to the Authenticator function in the ASN-GW (access service network gateway) server 114. The Authenticator uses the MSK to generate a set of special keys for encryption and integrity protection on the R1 radio interface.

In addition to MSK, the MS 102 and the AAA server 112 also generate an Extended Master Session Key (EMSK) which never leaves the AAA server. This EMSK is used to generate the special root key for protecting mobility, MIP-RK (mobile IP root key). The MIP-RK is then used to protect Mobile IP signaling (as defined by IETF RFC 3344, IP Mobility Support for IPv4 (MIPv4), August 2002, the disclosure of which is incorporated by reference herein) by way of generating the secure signatures of Mobile IP messages between the Mobile IP nodes. Note that IP mobile support for IPv6 is defined in RFC 3775, IP Mobility Support for IPv6 (MIPv6), June 2004, the disclosure of which is incorporated by reference herein Specifically, messages between a mobile node (MN) in the MS 102 and the Home Agent (HA) 116 in the CSN 108 are protected by the MN-HA Authentication Extension that uses an MN-HA Key generated from the MIP-RK. Messages between MN and the Foreign Agent (FA) in the ASN-GW server 114 are protected by MN-FA Authentication Extension that uses an MN-FA key produced from the MIP-RK, etc.

To support "simple" IP mobile terminals, the MN function can also be placed in a node in the access network. This so called Proxy Mobile IP Function (PMIP) follows the mobile as it moves from one ASN to another, re-registering it with the HA, and thus maintaining continuity of the IP session on the HA. The MN-HA key for the PMIP MN is usually delivered to the PMIP MN in the ASN with the AAA signaling indicating successful result of the EAP Access authentication.

Figure 2A:
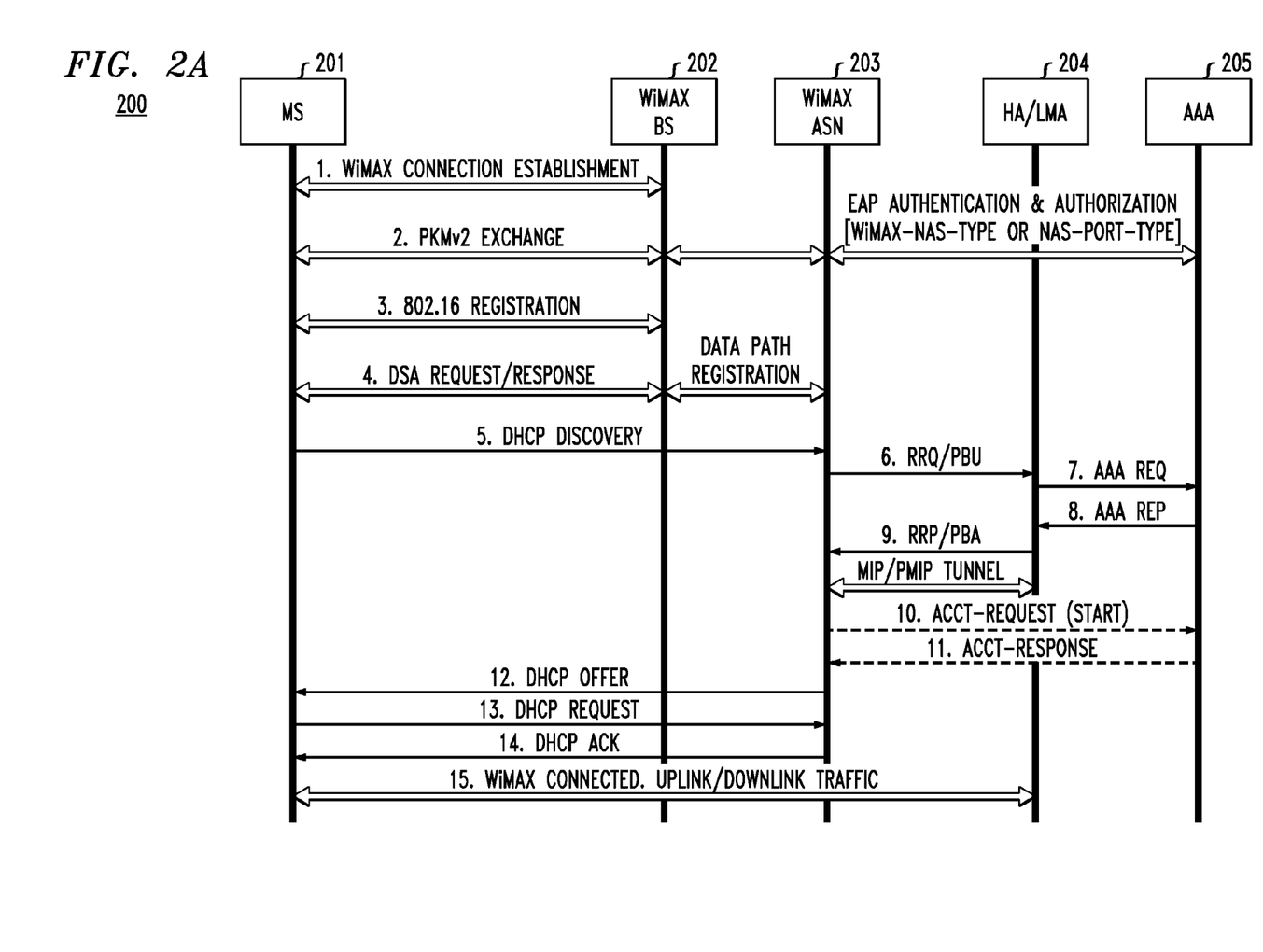
FIG. 2A illustrates a network entry methodology for a first access technology according to an embodiment of the invention.

FIG. 2A illustrates one embodiment of an initial network entry procedure 200 for when the access technology is WiMAX. As shown, with reference to the enumerated steps in procedure 200:

1. The WiMAX MS (communication device) 201 connects to the WiMAX BS (base station) 202 and establishes the WiMAX connection, for example, in accordance with WiMAX Forum Network Architecture Specification, Release 1.5, the disclosure of which is incorporated by reference herein.

2. The MS 201 authenticates with the WiMAX ASN 203 using PKMv2 and EAP method that can include any of the following: EAP-TLS/TTLS/CHAPv2/AKA. The MS 201 identifies itself with the NAI during access authentication. The WiMAX ASN 203 includes the NAS Type in the AAA Request to identify the access technology. At the end of this EAP authentication and authorization step, MSK is generated at the MS 201 and delivered from the AAA 205 to the WiMAX ASN 203 (ASN-GW Authenticator).

3. The MS 201 then registers with the 802.16 (WiMAX) network.

4. The MS 201 then establishes the service flows using DSA (Dynamic Service Addition) Request/Response and also completes data path registration with the ASN 203.

5. The MS sends a DHCPDISCOVER message in order to discover a DHCP (Dynamic Host Configuration Protocol) server for host IP configuration.

6. The PMIPv4 client or the PMIPv6 client in the Mobility Access Gateway (MAG) in the ASN 203 is triggered to initiate a registration procedure. The same NAI that is used during the EAP authentication procedure is used in the MIP RRQ or Binding Update message. Unless the optional simultaneous binding is supported and invoked, in the PMIPv4 RRQ message, the 'S' bit is set to "0". For the PMIPv6 PBU message, the Handoff Indicator option may be set to the value "1" (attachment over a new interface) and the Access Technology Type option may be set to the value "5" (IEEE 802.16e) as specified in RFC 5213, the disclosure of which is incorporated by reference herein. The rest of the fields are initialized as per WiMAX Forum Network Architecture, Release 1.5, PMIPv6 Stage 3 Specification, the disclosure of which is incorporated by reference herein. In general, as is known with respect to MIPv4 terminology, there is a MIPv4 Client, Foreign Agent (FA), and Home Agent (HA). In MIPv6 terminology, there is a MIPv6 Client and Home Agent (HA), but no FA. In Proxy MIPv4, the MIPv4 Client is co-located with the FA. In PMIPv6, the PMIPv6 Client is placed in the network element called MAG, and the HA is called Local Mobility Agent (LMA).

7. If the MN-HA key identified by the SPI (Security Parameter Index) is not available, the HA 204 requests the MN-HA key from the AAA 205.

8. The MN-HA key associated with the MN-HA SPI is returned to the HA 204 for MN-HA AE validation.

9. The HA/LMA 204 responds with the PMIP RRP or PMIP PBU message. Once the MN-A AE is validated, the HA/LMA 204 assigns an IP address to the MS 201. If the assigned HoA value in the MIP RRQ/PBU is 0.0.0.0, the HA 204 assigns the HoA, otherwise the HoA in the PMIP Registration request/PBU is used. If this is the initial entry for the MS 201, the HA/LMA 204 creates a binding cache for the MS 201. At this point, a PMIP tunnel is established between the ASN 203 and the HA/LMA 204.

10. The Accounting Client in ASN 203 sends an Acct-Request (start) message to the AAA 205.

11. Upon receiving the accounting request message, the AAA 205 sends an Acct-Response message to the Accounting Client.

12. The DHCP proxy in the ASN 203 sends a DHCPOFFER message to MS 201.

13. The MS 201 responds to the first DHCPOFFER message received with a DHCPREQUEST message to the DHCP proxy along with the address information received in the DHCPOFFER.

14. The DHCP Proxy acknowledges the use of this IP address and other configuration parameters as defined in RFC 2131, the disclosure of which is incorporated by reference herein, by sending a DHCPACK message.

15. The MS 201 is now connected to the WiMAX network such that uplink/downlink traffic can be exchanged.

A similar concept is used when the MS 102 operates through another access technology, such as, in this example, the IEEE 802.11 WiFi protocol. The EAP authentication is still executed between the MS 102 and the AAA server 112, except that the MSK generated as the result of EAP access authentication is delivered to the Authenticator function that is located in Wireless Interface Function (WIF) 118 of the special interface node called IWK Function 120. The MN-HA key for the PMIP function located in the IWK 120 is also delivered from the AAA 112 over the R3+ interface.

Figure 2B:
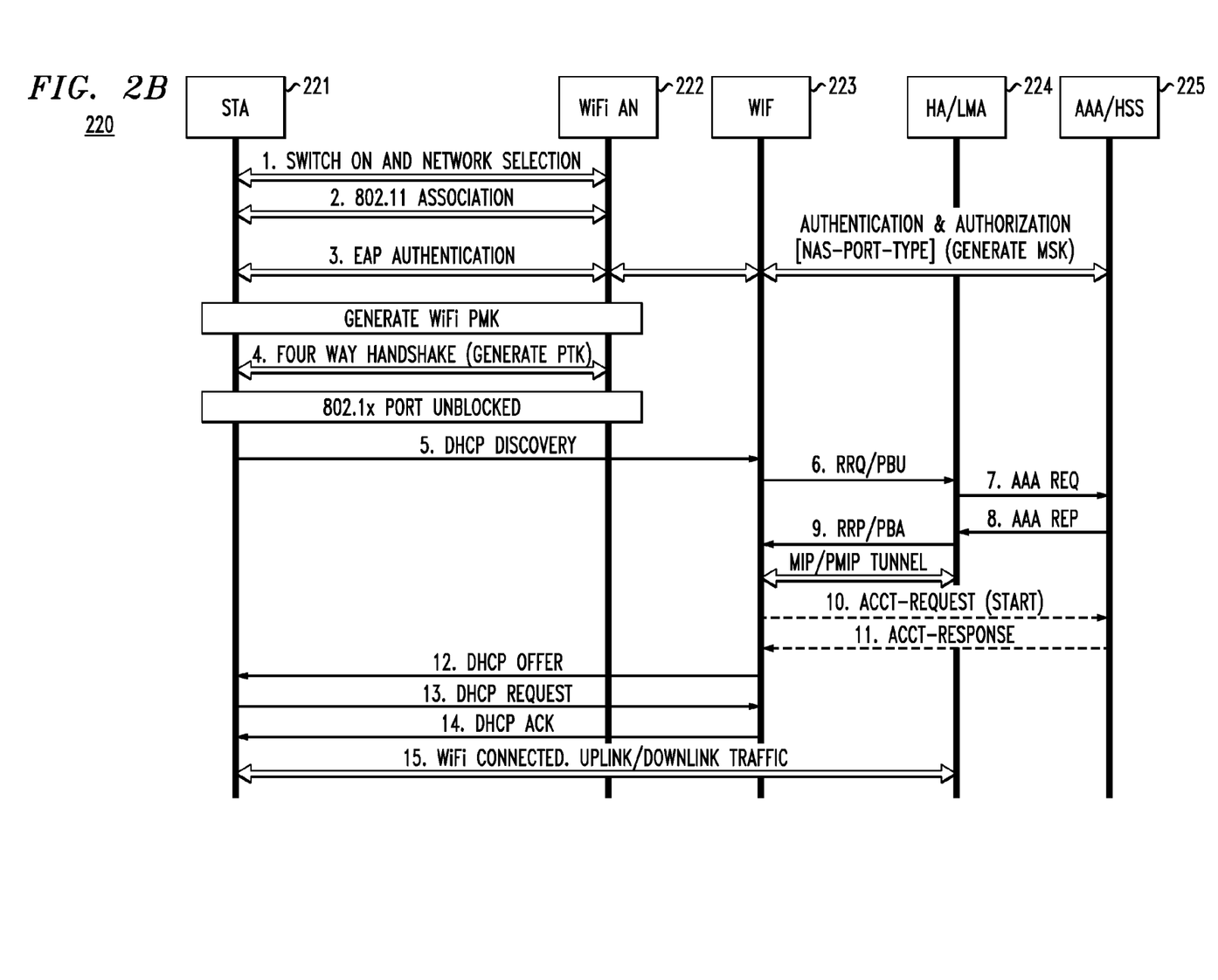
FIG. 2B illustrates a network entry methodology for a second access technology according to an embodiment of the invention.

FIG. 2B illustrates one embodiment of an initial network entry procedure 220 for when the access technology is WiFi. As shown, with reference to the enumerated steps in procedure 220:

1. The WiFi STA (communication device) 221 is switched on and captures WiFi signaling and then performs network discovery and selection.

2. The STA 221 establishes 802.11 Association with the WiFi AN 222.

3. The STA 221 authenticates with the WiFi AN 222 using 802.1X/EAPOL and various EAP methods such as EAP-TLS and EAP-AKA. The WiFi AN 222 forwards the EAP messages to the AAA Proxy in the WIF 223 which then facilitates authentication on behalf of the WiFi STA 221. The AAA Request from the WIF 223 contains the NAS Type identifying the access technology. During the authentication, the MSK generated in the AAA Server 225 is transferred to the WiFi AN 222, and then at the end of the WiFi authentication, a PMK or Pairwise Master Key (a secondary key used for the air interface security) is derived from the MSK at the WiFi AN 222.

The WiMAX-Session-ID and the CUI (Chargeable User Identity) are delivered to the Accounting Client at WIF 223.

4. The STA 221 then conducts a four-way handshake with the authenticator in the WiFi AN 222. During the four-way handshake procedure, a fresh Pairwise Transient Key (PTK) is derived from the PMK. Upon successful completion of the four-way handshake, the 802.1x port is unblocked.

5. The STA 221 sends a DHCPDISCOVER message in order to discover a DHCP server for host IP configuration.

6. The FA/MAG in the WIF 223 is triggered to initiate PMIP registration procedure. The same NAI used during the EAP authentication procedure is used in the RRQ/Binding Update message. Unless the optional simultaneous binding is supported and invoked, in the RRQ message, the 'S' bit is set to "0". For the PBU message, the Handoff Indicator option may be set to the value "1" (attachment over a new interface) and the Access Technology Type option may be set to the value "4" (indicating IEEE 802.11a/b/g) as specified in RFC 5213. The rest of he fields are initialized in the same manner as described above.

7. If the MN-HA key identified by the SPI is not available, the HA 224 requests the MN-HA key from the AAA 225.

8. The MN-HA key associated with the MN-HA SPI is returned to the HA 224 for MN-HA AE validation.

9. The HA/LMA 224 responds with the RRP/PMIP PBU message. Once the MN-A AE is validated, the HA/LMA 224 assigns an IP address to the STA 221. If the assigned HoA value in the MIP RRQ/PBU is 0.0.0.0, the HA 224 assigns the HoA, otherwise the HoA in the PMIP Registration request/PBU is used. If this is the initial entry for the STA 221, the HA/LMA 224 creates a binding cache for the STA 221. At this point, the PMIP tunnel is established between WIF 223 and the HA/LMA 224.

10. The Accounting Client at WIF 223 sends an Acct-Request (start) message to the AAA 225.

11. Upon receiving the accounting request message, the AAA 225 sends an Acct-Response message to the Accounting Client at WIF 223.

12. The DHCP Proxy in the WIF 223 sends a DHCPOFFER message to the STA 221.

13. The STA 221 responds to the first DHCPOFFER message received with a DHCPREQUEST message to the DHCP Proxy along with the address information received in DHCPOFFER.

14. The DHCP Proxy in the WIF 223 acknowledges the use of this IP address and other configuration parameters.

15. The STA 221 is now connected to the WiFi network such that uplink/downlink traffic can be exchanged.

It is realized that it may be desirable for the communication device (MS/STA) to pre-register on one access technology while still operating through another access technology. This may be effectuated by tunneling the signaling of the target access technology in the signaling capsule of a currently serving access technology, and delivering this encapsulated signaling to the target access technology through an IWK Function.

However, in accordance with existing EAP operations, as this signaling reaches the target access technology, it attempts to authenticate the access, and while doing so, generates the new security association that includes the new MSK and the new EMSK. The new MSK is delivered to the IWK and can be retained in its Authenticator until the MS/STA actually executes the handoff to the target technology. But, in existing EAP operations, the EMSK in the AAA will replace the currently active EMSK associated with the current session, and all secondary keys computed form the EMSK, such as MIP-RK, etc., will also be re-computed.

This will result in disparity between the security associations assumed by the network, and security associations handled by the mobile, and so connection will break.

To address this problem, principles of the invention advantageously operate to preserve multiple active, clearly distinguishable, security associations (contexts) to allow simultaneous mobile registrations on multiple access technologies.

According to an illustrative embodiment of the invention, when the AAA server 112 receives the request for Access Authentication, it checks the NAS Type (Network Access Server) of the Authenticator (in ASN-GW server 114 or WIF 118) indicating what access technology this request came from. The NAS Type is a standard attribute of the AAA RADIUS (IETF RFC 2865, Remote Authentication Dial In User Service, June 2000, the disclosure of which is incorporated by reference herein) and Diameter (IETF RFC 4005, Diameter Network Access Server Application, August 2005, the disclosure of which is incorporated by reference herein) signaling. Some Vendor-Specific Attributes (VSA) to enhance AAA signaling with technology-specific information are defined in respective access technology standards. For example, the WiMAX Forum defines its specific VSAs in its Stg. 3 document WMF-T33-00x-R015v01-J_NetworkStage3_V&V, the discourse of which is incorporated by reference herein.

In operation, if this is the initial network access, and the AAA server does not have any currently active security context for this mobile, the AAA server conducts the usual EAP Authentication procedure and stores the resulting security context as active. That is, MSK is generated and delivered to the Authenticator, the EMSK is generated and stored, the special Security Parameter Index (SPI) associated with EMSK is generated and stored, the MIP-RK and its SPI is generated and stored, the MN-HA and its associated MN-HA SPI is generated and stored, etc., as explained above.

In operation, if the AAA server already has the security context for this access technology, it conducts a re-authentication, and replaces the old context with the new context.

However, in an enhanced operation according to an embodiment of the invention, if the AAA server already has the security context for this access technology, it conducts a re-authentication, and replaces the old context with the new context only for this access technology, leaving other available security contexts intact.

In a further enhanced operation according to an embodiment of the invention, if the AAA server already has the security context for this mobile, but the request came from another access technology, the AAA server checks the subscription record of this mobile to verify that the mobile is capable and authorized for an access from the target access technology, and otherwise rejects the request.

In another enhanced operation according to an embodiment of the invention, if the request is associated with a Multi-Mode MS, and the access technology is supported and authorized for this mobile, the AAA server conducts the EAP access authentication and stores the new context alongside the already existing context for the current serving technology.

In a further enhanced operation according to an embodiment of the invention, when the request comes to the AAA server for the context-related parameters, such as, MN-HA key requested by the HA, etc., the AAA server will determine which context to use based on the associated SPI included in the request.

In a further enhanced operation according to an embodiment of the invention, when a specific security context expires due to its lifetime expiration, de-registration on a specific access technology, or any a policy-related limitation, the AAA server deletes this specific context while retaining other active contexts valid.

In a further enhanced operation according to an embodiment of the invention, when the session is terminated, all related security contexts are deleted.

Similar functional logic is applied to the multi-mode mobile device (MS), which generates the security context for a specific access technology when it accesses it, pre-registers on it, and is authenticated for it.

Accordingly, illustrative principles of the invention provide a methodology for generating and maintaining multiple active security associations between the MS (communication device) and the communication system at any given time for the same session, clearly distinguishing these contexts, their use, their replacement, and their deprecation. As such, it allows pre-registration on multiple target technologies without sacrificing performance of handoffs from one technology to another.

Thus, in accordance with illustrative principles of the invention, while in an active mode and connected to either WiMAX or WiFi access network, the WiMAX/WiFi communication device can pre-register and pre-authenticate on the alternate access technology (i.e. WiFi or WiMAX). In order to preserve the security context on the active serving network, the AAA generates a second security context for the same device, one that is associated with the disparate access technology where pre-registration and pre-authentication is performed.

In order to generate a unique security context for each access technology using the same NAI (network access identifier), the respective NAS reports its type in the AAA Request message to the authenticating network. When the AAA receives the AAA Request message, it checks the reported type of the Access Network, e.g., Network Access Server (NAS) Type, and determines, based on the NAI of the mobile, whether the request is for an initial network access or a pre-registration requiring additional security context for the device.

For initial network access, the AAA conducts the EAP Authentication procedure and stores the resulting security context and its associated Security Parameter Indices (SPI) as the active one for the device. Likewise, the MS associates the computed security context with the initial network access.

During the pre-registration on the disparate access technology, the supplicant in the dual mode device creates a second security context associated with the disparate access technology (this could also be handled by a second supplicant). Likewise, the AAA creates the second security context for the same session associated with the access technology on which the device has pre-registered.

If during an active session the AAA receives the AAA request from the same access technology associated with already existing security context, i.e., the same NAI and the same access technology (indicated through NAS type), the AAA conducts a re-authentication and replaces the security context with the newly generated one.

If the AAA already has the security context for the device, but the AAA request comes from the disparate access technology, the AAA checks the subscription record of the device to verify that it is authorized for access from the target access technology, in which case the AAA conducts the EAP access pre-authentication. Upon successful completion of the EAP authentication, the AAA generates a second security context with its associated SPI(s) and stores it alongside the active security context.

If the mobile is not authorized to access the disparate access technology, the AAA rejects the AAA request.

For a device that can access multiple network types (multi-mode device), when specific security context expires due to its lifetime expiration or de-registration on one of the access technologies, the AAA and the MS/STA delete the expired context while retaining other valid contexts.

For a multi-mode device, when the session is terminated, all the related security contexts are deleted at the AAA, NASs and MS.

Figure 2C:
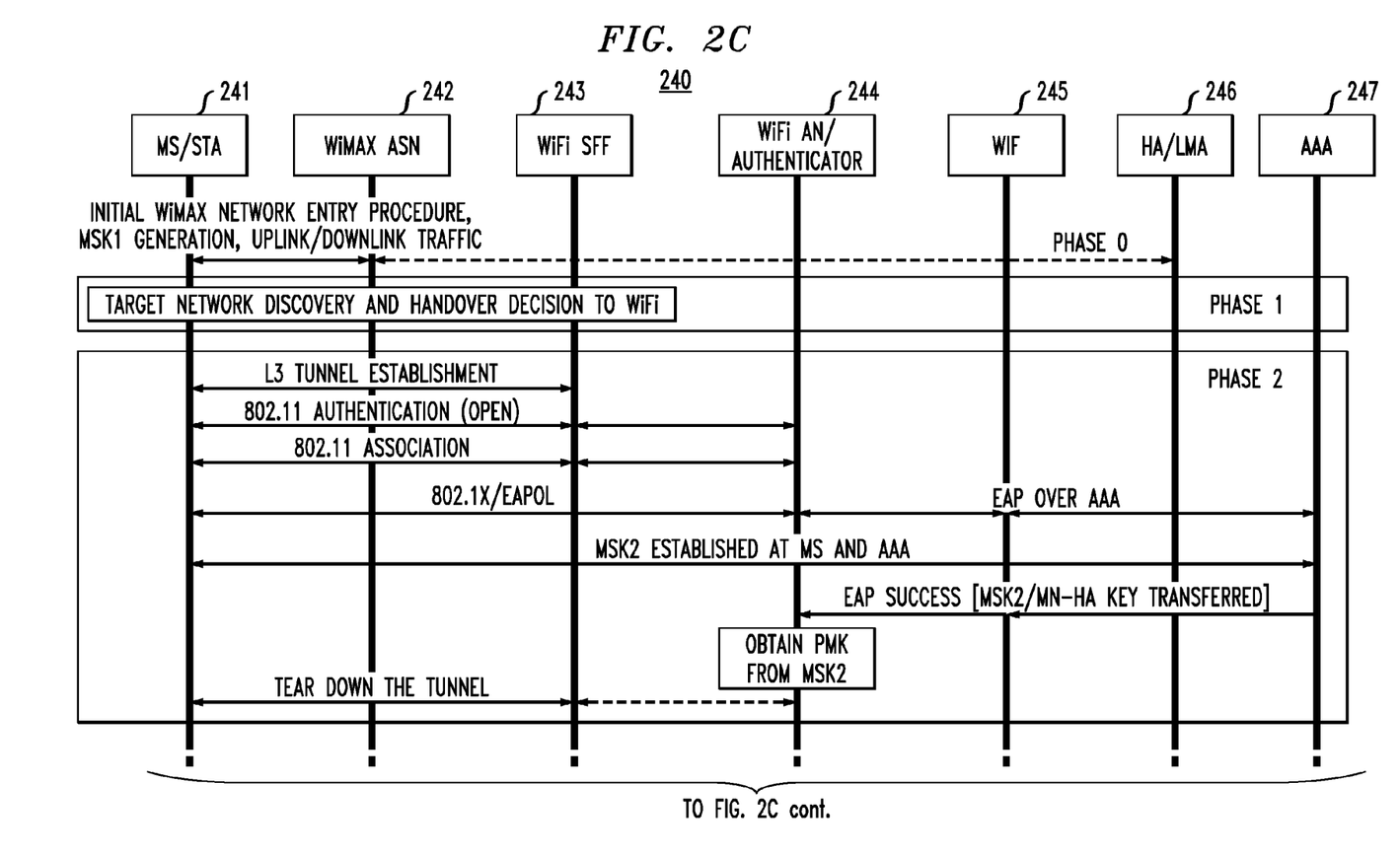
FIG. 2C illustrates a methodology for pre-registration security support in a multiple access technology environment according to an embodiment of the invention.

FIG. 2C illustrates one embodiment of a handover procedure 240 from a WiMAX network to an 802.11i WiFi network. In this scenario, it is assumed that initially the MS/STA dual-mode single radio (note: single radio means only one transmitter WiFi or WiMAX can transmit at any given time) is connected to the WiMAX network. It is further assumed that the MS learns about availability of the WiFi network and the interworking functionality. At this point, based on one or more decision criteria, the MS/STA decides to handover to the WiFi network. WiMAX to WiFi handover procedures for IEEE 802.11i based WiFi network is composed of multiple phases (note that similar steps can be invoked in a straight-forward manner for other types of WiFi networks), as shown in procedure 240:

Phase Zero: Initial WiMAX Network Entry. The mobile device (MS/STA 241) is initially connected to the WiMAX access network 242. Initial WiMAX network entry procedure is described in detail above in the context of FIG. 2A. During initial network entry and after a successful EAP procedure, MSK is generated. We call it as MSK1 (part of first security context).

Phase One: Target Network Detection and WiFi-SFF (Signaling Forwarding Function) discovery. MS/STA 241 detects the WiFi network signal to determine a target AP (Access Point) and it discovers the address of the WiFi-SFF 243 through DHCP or DNS procedure.

Phase Two: Tunnel set-up and EAP-authentication:
1. After the MS/STA 241 discovers the address of WiFi-SFF 243, the MS/STA 241 establishes an IP tunnel to the WiFi-SFF 243.
2. The EAP-authentication procedure over the tunnel is as per the IEEE 802.11i specification, the disclosure of which is incorporated by reference herein, and is as described below:

The MS/STA 241 sends Authentication Request frame with Open System algorithm to the target AP and receives Authentication Response frame from the target AP. The BSSID in the frame must be the BSSID of determined target AP. The WiFi-SFF 243 discovers the target WiFi access based on the BSSID in the Authentication Request frame and forwards the frame to the target network.

The MS/STA 241 associates to the target AP by sending Association Request frame to the AP and receiving Association Response frame from the AP.

The MS/STA 241 sends the EAPOL-Start message to the target WiFi access network to initiate EAP-authentication over the IP tunnel. The WiFi SFF forwards this message to the Authenticator located in the WiFi access network 244.

The MS/STA 241 and authentication server (AAA) 247 derive MSK. We call it MSK2 (part of second security context). The authentication server 247 sends the MSK2 to the authenticator in target WiFi network 244, and any mobility keys to the PMIP client at the WIF 243. The authenticator derives PMK from MSK2 according to 802.11i specification.

3. MS/STA 241 releases the IP tunnel created earlier with the WiFi SFF 243.

Phase Three: Handover to WiFi:
1. MS/STA 241 decides to handover to the WiFi access network. WiFi interface is powered on and WiMAX interface may go into idle mode.
2. The dual mode single-radio MA/STA 241 sends a re-association message to the target WiFi AN 244 with PMKID (s) in the RSN (Robust Security Network) information to map with the earlier derived PMK.

Phase Four: IP session continuity. The MS/STA 241 requests and receives IP address anchored at the HA 246. In this case, request and reply messages are proxied by DHCP proxy & PMIP Client/MAG in the Interworking Function WIF 245.

Figure 2D:
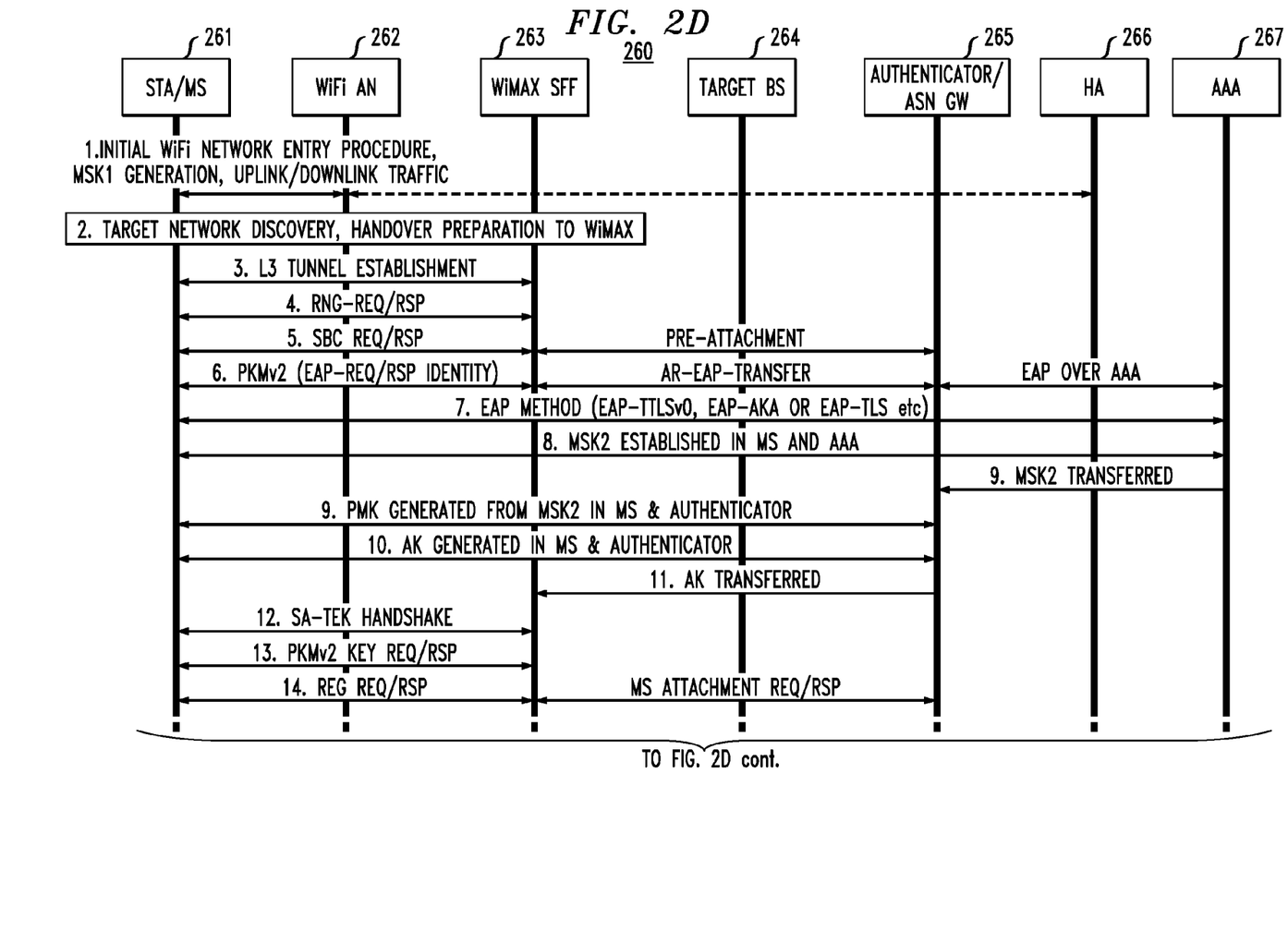
FIG. 2D illustrates a methodology for pre-registration security support in a multiple access technology environment according to another embodiment of the invention.

FIG. 2D illustrates one embodiment of a handover procedure 260 from a WiFi network to a WiMAX network. In this scenario, it is assumed that initially the MS/STA is connected to the WiFi network. It is further assumed that the MS learns about availability of the WiMAX network and the interworking functionality. At this point, based on one or more decision criteria, the MS/STA decides to handover to the WiMAX network. WiFi to WiMAX handover procedures is composed of multiple phases, as shown in procedure 260:

Phase Zero: Initial WiFi Network Entry (step 1 as shown in FIG. 2D). Initially the MS/STA 261 is connected to the WiFi network. Initial WiFi network entry procedure is described above in the context of FIG. 2B. During initial network entry and after a successful EAP procedure, MSK is generated. We call this as MSK1 (part of the first security context). Later, the MS/STA 261 detects availability of the WiMAX network and learns interworking support. At this point, based on one or more decision criteria, MS/STA decides to handover to the WiMAX network. Overall procedure for WiFi to WiMAX single radio handover is composed of four phases.

Phase one: Target network detection and WiMAX-SFF discovery (step 2 as shown in FIG. 2D). MS/STA 261 detects the WiMAX network signal and it discovers the address of the WiMAX SFF 263.

Phase two: Tunnel set-up and pre-initial network entry, i.e., pre-registration phase (steps 3 through 15 as shown in FIG. 2D). After the MS/STA 261 discovers the address of WiMAX-SFF 263, it establishes a tunnel to the WiMAX-SFF 263 in the WiMAX network. The MS/STA 261 then performs the initial WiMAX network entry procedure over the tunnel between the MS/STA 261 and the WiMAX-SFF 263. After successful EAP procedure, MSK is generated and sent by the AAA 267. We call this as MSK2 (part of the second security context).

Phase three: Radio Handover action including Active or Idle-to-active (steps 16 through 32 as shown in FIG. 2D). MS/STA 261 performs handover procedure to the target BS 264 present in the ASN 265. When MS/STA 261 decides to handover to the target BS 264 in ASN 265, it performs "SR Handover Action" procedure toward WiMAX.

Phase four: Release network resources. After the MS/STA gets an IP address from the HA 266, in the above phase, the previous network releases the network resources.

Note that, in one or more illustrative embodiments, standard steps and call flows may be similar to and aligned with the 3G-WiMAX handover procedures/call flows defined by the Network Working Group of the WiMAX Forum.

Figure 3:
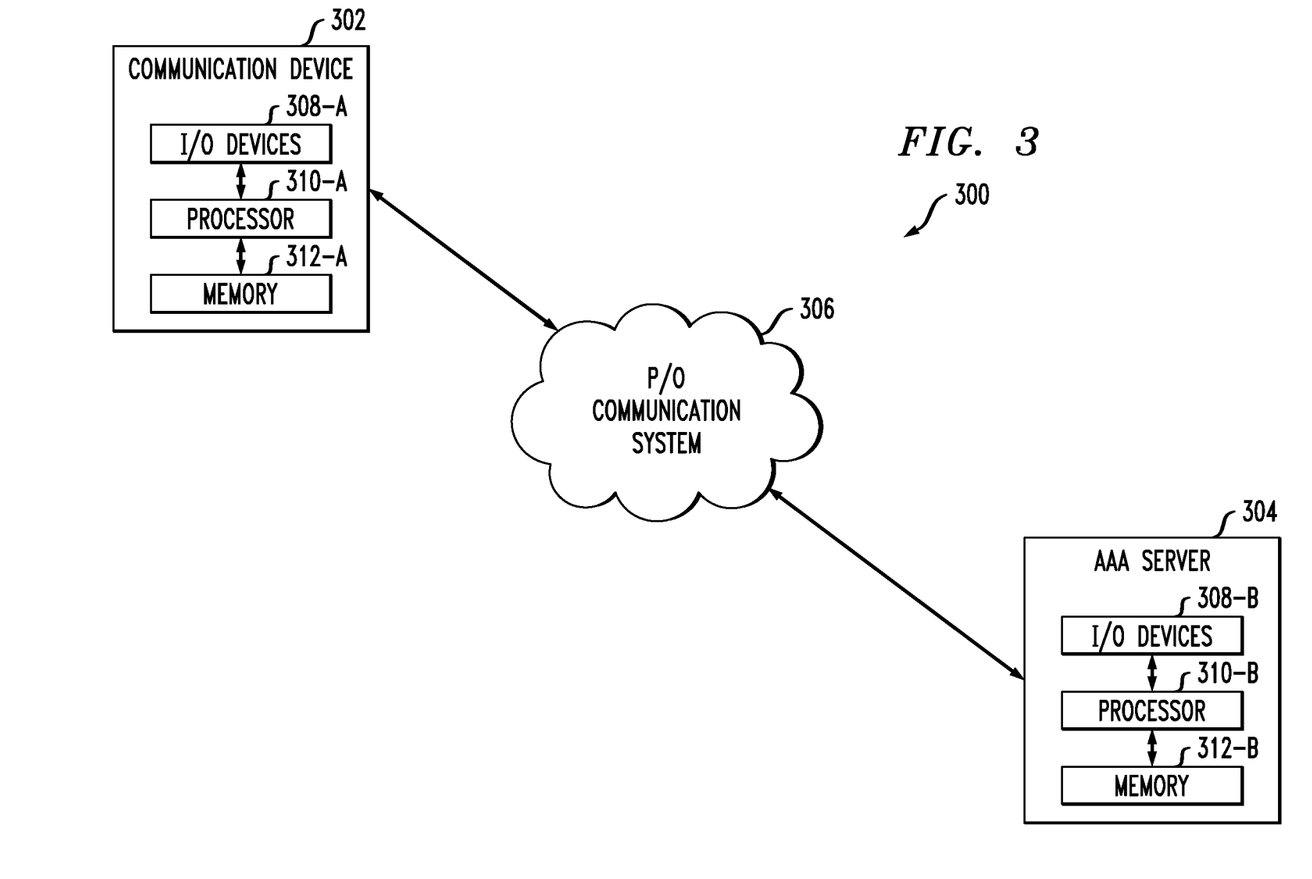
FIG. 3 illustrates generalized hardware architecture of a portion of communication system suitable for implementing pre-registration security support in a multiple access technology environment according to one or more embodiments of the present invention.

FIG. 3 illustrates generalized hardware architecture 300 of a portion of communication system suitable for implementing pre-registration security support in a multiple access technology environment according to the present invention. While FIG. 3 shows only two entities, it is to be understood that other entities can have the same or similar configuration. Thus, in terms of the pre-registration security support described above, the two entities may be a mobile subscriber communication device (MS 102 of FIG. 1 and MS/STA of FIGS. 2A through 2D) and an AAA server (AAA server 112 of FIG. 1 and AAA of FIGS. 2A through 2D). However, other components shown in FIG. 1 may be implemented with the same or similar architecture as shown in a computing device of FIG. 3. Thus, for the sake of simplicity, all the devices that may participate in the methodologies of the invention are not shown in FIG. 3.

As shown, the communication device designated 302 and the AAA server designated 304 are coupled via at least two access networks associated with the communication system portion 306. This may include one or more of the other components shown in FIG. 1 and may include a publicly-accessible wide area communication network such as a cellular communication network operated by a network operator. However, the invention is not limited to a particular type of network. Typically, the communication device could be, but is not limited to, a cellular phone, a smart phone, a desktop phone, a personal digital assistant, a laptop computer, a personal computer, etc.

As would be readily apparent to one of ordinary skill in the art, the servers and communication devices may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols described herein.

Nonetheless, FIG. 3 generally illustrates an exemplary architecture for each device/server communicating over at least two access networks associated with communication system 306. As shown, communication device 302 comprises I/O devices 308-A, processor 310-A, and memory 312-A. AAA server 304 comprises I/O devices 308-B, processor 310-B, and memory 312-B. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in a computing device of a communication system, wherein the communication system supports two or more access technologies for permitting a given communication device to access the communication system, and wherein at least part of a first security context is generated at the computing device for the given communication device permitting the given communication device to access the communication system via a first access technology, the method comprising:

generating at the computing device at least part of at least a second security context for the given communication device such that the given communication device is pre-registered to access the communication system via at least a second access technology while maintaining the first security context and such that the given communication device is able to continue to access the communication system via the first access technology and is pre-registered to subsequently access the communication system via the second access technology;

wherein the second security context is generated before a decision is made to perform a handover from the first access technology to the second access technology.

2. The method of claim 1, further comprising the computing device:
receiving a request to require initiation of a re-authentication procedure from the first access technology for the given communication device;
generating, in response to a successful re-authentication procedure, at least part of a new security context for the given communication device for the first access technology; and
replacing the first security context with the new security context.

3. The method of claim 1, further comprising the computing device verifying whether the given communication device is authorized for access from the second access technology before generating the second security context.

4. The method of claim 3, wherein the computing device rejects the pre-registration when it is determined that the given communication device is not authorized to access the communication system via the second access technology.

5. The method of claim 1, further comprising the computing device deleting one or more security contexts when at least one of: (i) the one or more security contexts expire; and (ii) the one or more security contexts are de-registered on one or more of the access technologies.

6. The method of claim 1, further comprising the computing device deleting any corresponding security contexts when a session in which the given communication device is accessing the communication system is terminated.

7. The method of claim 1, wherein the given communication device accesses the communication system via the second access technology in the same communication session that the given communication device accessed the communication system via the first access technology.

8. The method of claim 1, wherein the computing device comprises an authentication server managed by a network service provider in the communication system.

9. The method of claim 1, wherein one of the first access technology and the second access technology comprises a WiFi network, and the other of the first access technology and the second access technology comprises a WiMAX network.

10. Apparatus for use in a computing device of a communication system, wherein the communication system supports two or more access technologies for permitting a given communication device to access the communication system, and wherein at least part of a first security context is generated at the computing device for the given communication device permitting the given communication device to access the communication system via a first access technology, the apparatus comprising:
a memory; and
a processor coupled to the memory and configured to generate at the computing device at least part of at least a second security context for the given communication device such that the given communication device is pre-registered to access the communication system via at least a second access technology while maintaining the first security context such that the given communication device is able to continue to access the communication system via the first access technology and is pre-registered to subsequently access the communication system via the second access technology;
wherein the second security context is generated before a decision is made to perform a handover from the first access technology to the second access technology.

11. The apparatus of claim 10, wherein the processor is further configured to:
receive a request to require initiation of a re-authentication procedure from the first access technology for the given communication device;
generate, in response to a successful re-authentication procedure, a new security context for the given communication device for the first access technology; and
replace the first security context with the new security context.

12. The apparatus of claim 10, wherein the processor is further configured to verify whether the given communication device is authorized for access from the second access technology before generating the second security context.

13. The apparatus of claim 12, wherein the processor rejects the pre-registration when it is determined that the given communication device is not authorized to access the communication system via the second access technology.

14. The apparatus of claim 10, wherein the processor is further configured to delete one or more security contexts when at least one of: (i) the one or more security contexts expire; and (ii) the one or more security contexts are de-registered on one or more of the access technologies.

15. The apparatus of claim 10, wherein the processor is further configured to delete any corresponding security contexts when a session in which the given communication device is accessing the communication system is terminated.

16. The apparatus of claim 10, wherein the given communication device accesses the communication system via the second access technology in the same communication session that the given communication device accessed the communication system via the first access technology.

17. The apparatus of claim 10, wherein the computing device comprises an authentication server managed by a network service provider in the communication system.

18. The apparatus of claim 10, wherein one of the first access technology and the second access technology comprises a WiFi network, and the other of the first access technology and the second access technology comprises a WiMAX network.

19. A method for use in a communication device of a communication system, wherein the communication system supports two or more access technologies for permitting the communication device to access the communication system, and wherein at least part of a first security context is generated at the communication device permitting the communication device to access the communication system via a first access technology, the method comprising:
generating at the communication device at least part of at least a second security context for the communication device such that the communication device is pre-registered to access the communication system via at least a second access technology while maintaining the first security context such that the communication device is able to continue to access the communication system via the first access technology and is pre-registered to subsequently access the communication system via the second access technology;
wherein the second security context is generated before a decision is made to perform a handover from the first access technology to the second access technology.

20. The method of claim 19, wherein the at least a part of the first security context is generated by a first supplicant instantiated in the communication device, and the at least a part of the second security context is generated by a second supplicant instantiated in the communication device.

21. Apparatus for use in a communication device of a communication system, wherein the communication system supports two or more access technologies for permitting the communication device to access the communication system, and wherein at least part of a first security context is generated at the communication device permitting the communication device to access the communication system via a first access technology, the apparatus comprising:
- a memory; and
- a processor coupled to the memory and configured to generate at the communication device at least part of at least a second security context for the communication device such that the communication device is pre-registered to access the communication system via at least a second access technology while maintaining the first security context such that the communication device is able to continue to access the communication system via the first access technology and is pre-registered to subsequently access the communication system via the second access technology;
- wherein the second security context is generated before a decision is made to perform a handover from the first access technology to the second access technology.

* * * * *